United States Patent [19]

Halioua et al.

[11] Patent Number: 4,641,972

[45] Date of Patent: Feb. 10, 1987

[54] METHOD AND APPARATUS FOR SURFACE PROFILOMETRY

[75] Inventors: Maurice Halioua, Sea Cliff, N.Y.; Venugopal Srinivasan, Singapore, Singapore

[73] Assignee: New York Institute of Technology, Old Westbury, N.Y.

[21] Appl. No.: 650,824

[22] Filed: Sep. 14, 1984

[51] Int. Cl.⁴ .............................................. G01B 11/24
[52] U.S. Cl. ................................ 356/376; 250/237 G; 356/375
[58] Field of Search ....................... 356/376, 375, 1, 2; 250/237 G

[56] References Cited

U.S. PATENT DOCUMENTS

| | | | |
|---|---|---|---|
| 3,627,427 | 12/1971 | Johnson et al. | 356/376 |
| 3,879,133 | 4/1975 | Mathieu. | |
| 4,188,124 | 2/1980 | Jaerisch et al. | 356/356 |
| 4,191,476 | 3/1980 | Pollard | 356/349 |
| 4,212,073 | 7/1980 | Balasubramanian | 356/376 X |
| 4,349,277 | 9/1982 | Mundy et al. | 356/376 |

FOREIGN PATENT DOCUMENTS 2512945  3/1983  France.

OTHER PUBLICATIONS

Cline et al, *Applied Optics, vol. 21, No. 24, Dec. 12, 1982, pp. 4481–4488.*

*Primary Examiner*—F. L. Evans
*Attorney, Agent, or Firm*—Martin Novack

[57] ABSTRACT

Phase measurements of deformed grating images are used in performing improved optical profilometry. In one embodiment, phase differences between images of an object and a reference plane are used to obtain a measure of the object height.

11 Claims, 14 Drawing Figures

METHOD AND APPARATUS FOR SURFACE PROFILOMETRY

BACKGROUND OF THE INVENTION

This invention relates to the determination of the surface height of three-dimensional objects and, more particularly, to an improved apparatus and method of surface profilometry.

Surface profile measurement by non-contact optical methods has been extensively studied because of its importance in fields such as automated manufacturing, component quality control, medicine, robotics and solid modeling applications. In most of these methods a known periodic pattern, such as a grating, is projected on the surface to be measured and the image of the grating, deformed by the surface, is analyzed to determine the profile. "Demodulation" of the deformed grating by means of a matched reference grating results in the well known Moire fringe patterns, which are easily interpretable as surface contours by a human observer, but, are somewhat more complicated for computer analysis. (See, for example, D. M. Meadows, W. O. Johnson and J. B. Allen, Appl. Opt. 9, 942 (1970); H. Takasaki, Appl. Opt. 9, 1467 (1970); P. Benoit, E. Mathieu, J. Hormiere and A. Thomas, Nouv. Rev. Opt. 6, 67 (1975); T. Yatagai, M. Idesawa and S. Saito, Proc. Soc. Photo-Opt. Instrum. Eng. 361, 81 (1982)). Improvements to the Moire method, aimed at increasing accuracy and at automating the measurements have been based, for example, on phase modulation. (See G. Indebetouw, Appl. Opt. 17, 2930 (1978), D. T. Moore and B. E. Truax, Appl. Opt. 18, 91 (1979).

An alternative approach to Moire is by an analysis of the deformed grating itself without the use of a physical or virtual reference grating. Direct methods based on geometrical analysis of the deformed grating requiring fringe peak determination are computationally complex, slow, and result in low accuracy. Another direct method, based on the use of a Fast Fourier Transform analysis of the deformed grating, has been demonstrated to be more suitable for automated profilometry (see, for example, M. Takeda and K. Mutoh, Appl. Opt. 22, 3977 (1983)). Limitations on measurement of steep object slopes and step discontinuities, the need for high resolution imaging systems and the need for powerful computing capability are some of the disadvantages of the Fast Fourier Transform method.

It is among the objects of the invention to provide an improved method and apparatus for surface profilometry.

SUMMARY OF THE INVENTION

The invention employs, inter alia, phase measuring techniques that have been used in classical interferometry, but are particularly advantageous for use in deformed grating profilometry. When a sinusoidal intensity distribution is projected on a three dimensional diffuse surface, the mathematical representation of the deformed grating image intensity distribution is similar to that encountered in conventional optical interferometry. The surface height distribution can be translated to a phase distribution, and the accuracy which is characteristic of phase modulation interferometry, can be used to advantage here. [See, for example, J. H. Bruning, D. R. Herriott, J. E. Gallagher, D. P. Rosenfeld, A. D. White and D. J. Brangaccio, Appl. Opt. 13, 2693 (1974); J. C. Wyant, Appl. Opt. 14, 2622 (1975) for background.] Further, by using several phase modulated frames of deformed grating image data, a high degree of precision in the phase measurement can be achieved. By analogy with phase-measuring interferometry, where phase values can be measured with a resolution of 1/1000 of a fringe period (versus 1/30 for conventional single frame interferometry), surface profile measurements with less than 10 micron resolution are possible by the use of an optical system with a projected grating pitch in the millimeter range.

In accordance with an embodiment of the method of the invention, a technique is set forth for determining the surface profile of a three-dimensional object. An incident beam of light, having a sinusoidally varying intensity pattern, is directed at the object. The phase of the sinusoidal pattern of the incident beam is modulated. A deformed grating image of the object is received, at a detector array, for a number of different modulated phases of the input beam. The height of each point (i.e., elemental region) of the surface of the object is then determined with respect to a reference plane, each such height determination including the combining of the image intensity values at a detector position corresponding to a respective point of the object.

In the disclosed embodiments of the invention, the combined intensity values, for the object and for the reference plane, are used to obtain an object phase for each point and a reference phase for each point. In one embodiment the difference between the object and reference phases for corresponding points is used in the height determination. In another embodiment, a phase mapping as between object and reference phases is used in the height determination.

Among the advantages of the invention are the following: relatively simple optical hardware; relatively low frequency grating and low density detector array; full frame data capture and relatively simple processing.

Further features and advantages of the invention will become more readily apparent from the following detailed description when taken in conjunction with the accompanying drawings.

DESCRIPTION OF THE PREFERRED EMBODIMENT

Figure 1:
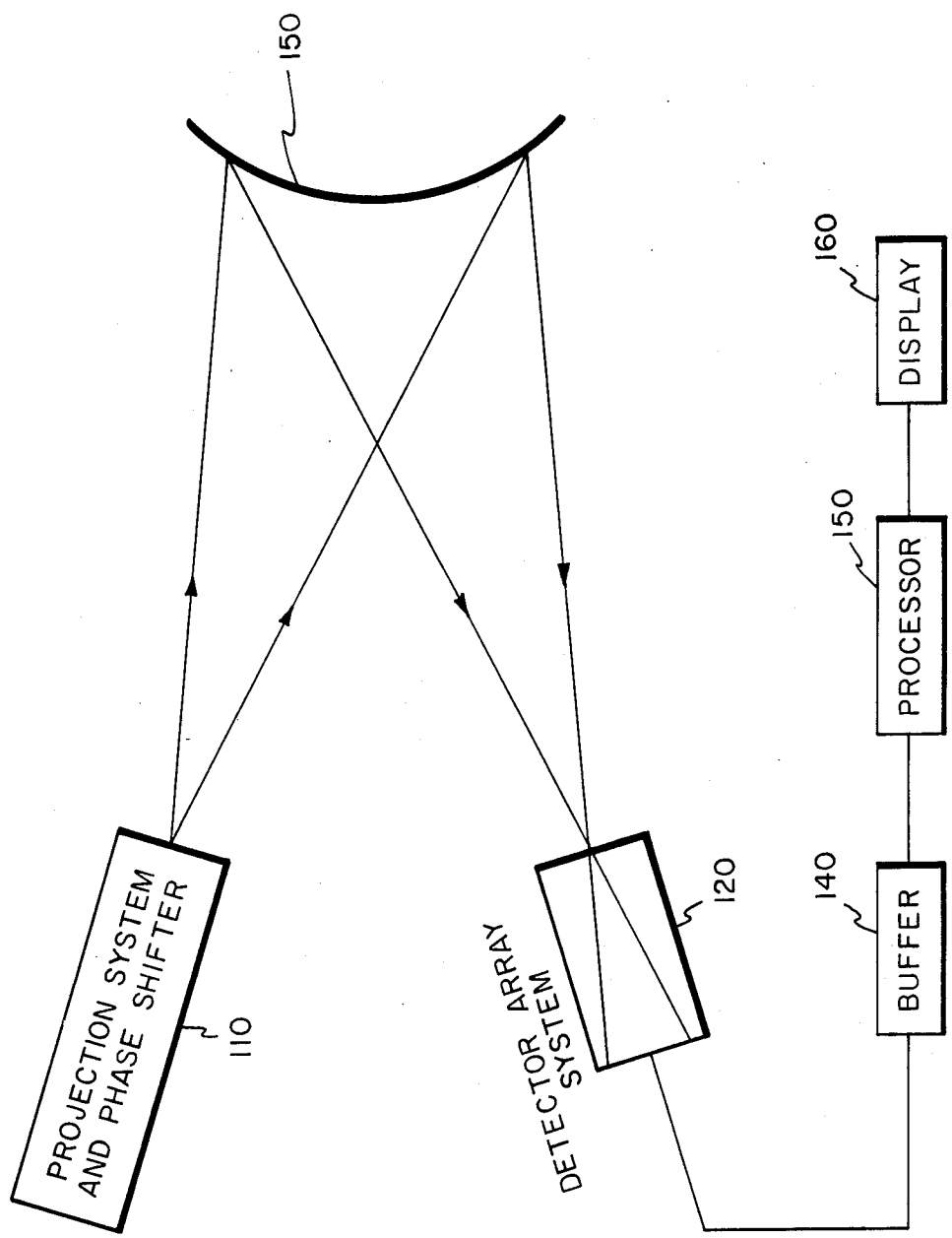
FIG. 1 is a block diagram, partially in schematic form, of an apparatus in accordance with the invention, and which can be used to practice the method of the invention.

Referring to FIG. 1, there is shown a block diagram of an apparatus in accordance with the invention, and which can be used to practice the method of the invention. A sinusoidal grating projection system and phase shifter 110 is provided, and projects an optical beam at a three dimensional object 150. The reflected beam is received by a detector array systems 120 which, in the illustrated embodiment detects frames of data which are stored in buffer 140 and processed by processor 150. The processor 150 may be, for example, any suitable analog or digital computer, processor, or microprocessor and conventional associated memory and peripherals, programmed consistent with the teachings hereof. In the experiments described hereinbelow, a model LSI 11/23, made by Digital Equipment Corp., was utilized. The processed information can be displayed on a display device 160.

Figure 2:
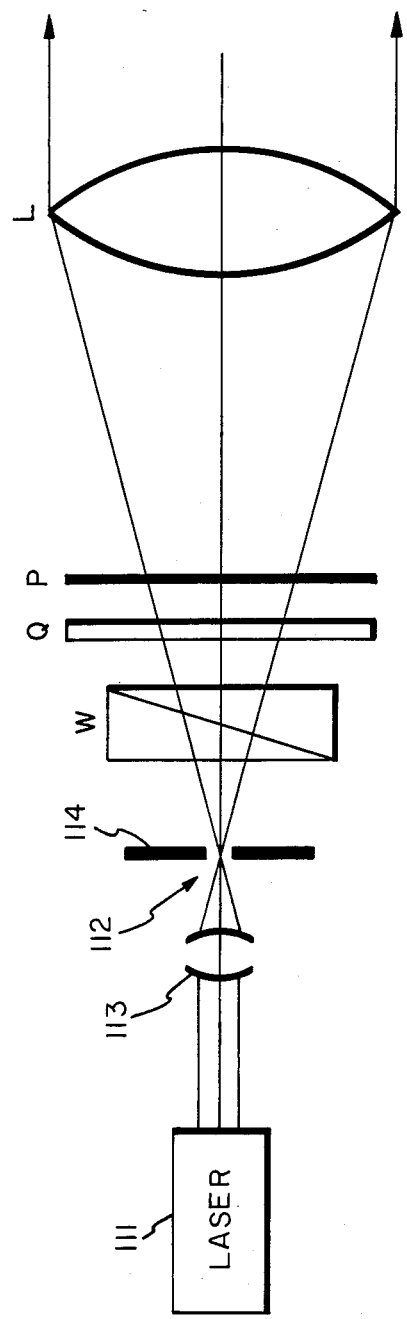
FIG. 2 is a schematic diagram of an embodiment of a projection and phase shifting system as used in the FIG. 1 embodiment.

A sinusoidal intensity distribution can be projected on the surface to be profiled, e.g. by generating an interference pattern between two coherent plane wavefronts or by projecting an image of a grating with sinusoidal transmission function distribution illuminated by an incoherent light source. FIG. 2 illustrates an embodiment of the projection system and phase shifter 110 (of FIG. 1), which comprises a laser illuminated shearing polarization interferometer. The linearly polarized output beam from the laser 111 is spatially filtered by filter 112, which includes lens 113 and pinhole 114, and then sheared by a Wollaston prism W. The phase modulator includes a combination of a quarter wave plate Q and a rotatable polarized P. By rotating the polarizer, the sinusoidal intensity distribution of the interference pattern can be modulated. A 180° rotation of the polarizer corresponds to a $2\pi$ phase modulation and this permits precise phase shifts. It will be understood that other types of phase shifters, for example polarization dependent phase shifters such as electro-optic modulators, may also be used in this system. The fringe period can also be easily changed by an axial translation of the Wollaston prism W. A collimating lens L is used to conserve light and simplify the optical geometry.

Figure 3:
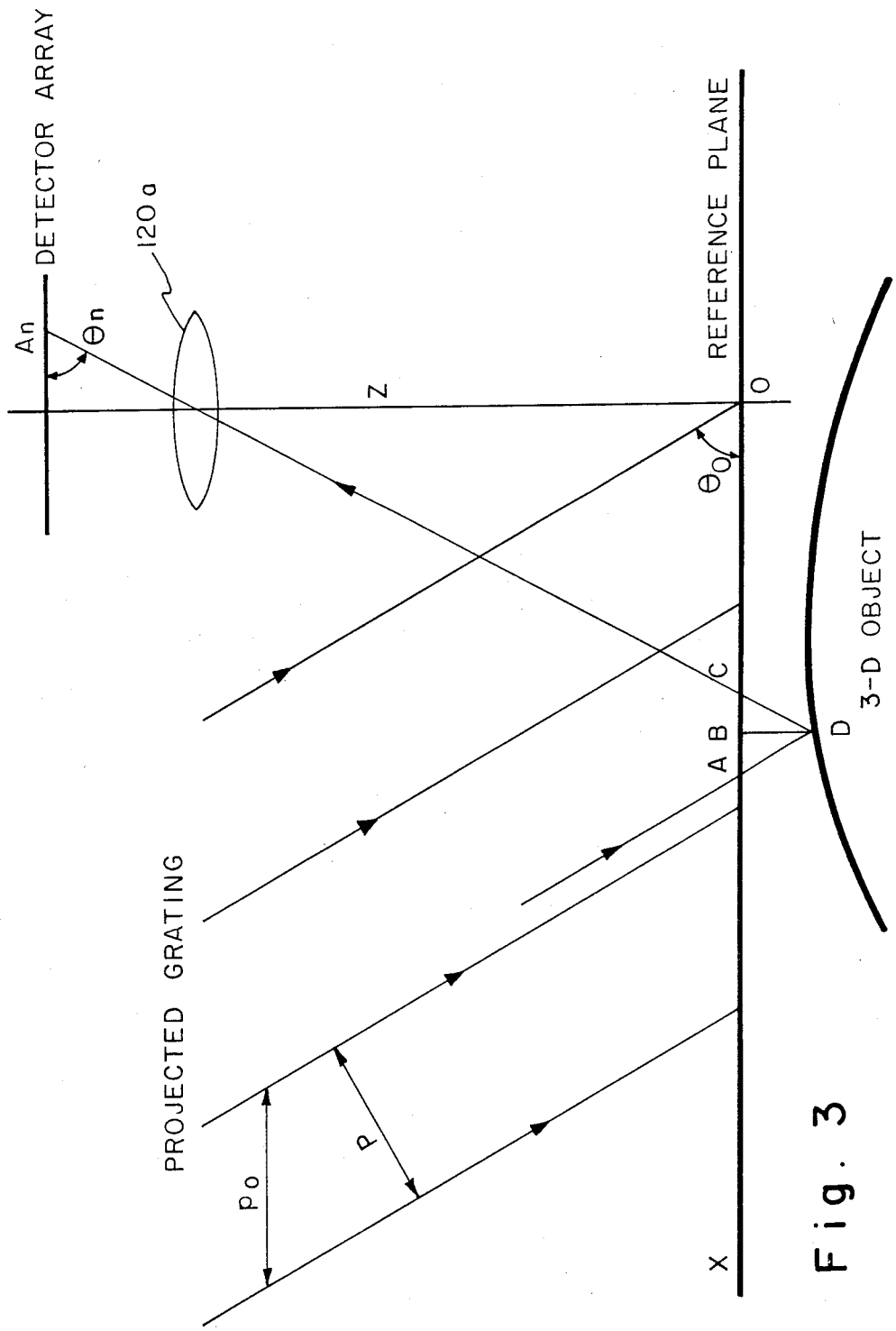
FIG. 3 illustrates the optical geometry of a form of the FIG. 1 embodiment, as used for an analysis of operation.

Before further describing operation of the apparatus of this embodiment, consider the diagram of FIG. 3 in which the height h(x,y) of object 150 is to be measured relative to the indicated reference plane. The projected sinusoidal interferometric pattern has a period $p_o$ as seen on the reference plane, and the intensity that it produces at a point, such as C on the reference plane, is $$I = a(x,y) + b(x,y) \cos(2\pi OC/p_o) \quad (1)$$

where a(x,y) is the background or DC light level, b(x,y) is the fringe contrast and O, the intersection of the imaging optical axis with the reference plane is assumed, for convenience, to coincide with an intensity maxima of the projected pattern. The argument $\phi_R = 2\pi OC/p$ of the cosine function in Eq. (1) is defined as the "phase" at C and it effectively measures the geometric distance OC, if O is taken at the reference point where the phase is zero. $A_n$ is one of the detectors in the array, located at the image plane and is used to measure the intensity at C on the reference plane and at D on the object. An imaging lens 120a, of the detection system 120, is shown in the FIG. 3 diagram. The intensity observed at D is the same as that which would have been observed at A on the reference plane, modified by the object reflectivity r(x,y), that is $$I_D = r(x,y)[a(x,y) + b(x,y) \cos(2\pi OA/p_o)] \quad (2)$$

The difference $\Delta\phi_{CD}$ in phase values for the points C and D, observed by the same detector $A_n$, can be related to the geometric distance AC as follows:

$$AC = (p_o/2\pi) \cdot \Delta\phi_{CD} \quad (3)$$

AC is related to the surface height BD as follows:

$$BD = AC \tan\theta_o/(1 + \tan\theta_o/\tan\theta_n) \quad (4)$$

where the angles $\theta_o$ and $\theta_n$ as shown in FIG. 3. Assuming that $\theta_n$ is nearly 90, as is the case for any practical system with a large demagnification factor, the relationship (4) can be simplified to:

$$BD = AC \tan\theta_o \quad (5)$$

From Eqs. (3) and (5), the effective wavelength of the system is defined as $\lambda_e = p_o \tan\theta_o$.

To measure the phase of the intensity variation represented by either Eq. (1) of Eq. (2), the projected pattern can be phase modulated by rotating the polarizer P (FIG. 2). In the case of Eq. (1), let $$\phi_R = 2\pi OC/p_o = 2\pi M + \phi_R' \quad (6)$$

where $\phi_R'$ is the phase angle reduced to the range $0-2\pi$ and M is an integer. If $\phi_M$ represents the phase modulation, then from Eq. (1), $$I_C = a(x,y) + b(x,y) \cos(\phi_M + \phi_R') \quad (7)$$

N measurements $I_1, I_2, \ldots I_N$ of $I_C$ are made with a phase increment of $2\pi/N$ following each measurement. From these measurements, one obtains, $$\tan\phi_R' = \sum_1^N I_n \sin(2\pi n/N) / \sum_1^N \cos(2\pi n/N) \quad (8)$$

[See J. H. Bruning, D. R. Herriott, J. E. Gallagher, D. P. Rosenfeld, A. D. White and D. J. Brangaccio, Appl. Opt. 13, 2693 (1974).] By recording N frames of intensity data, the phase seen by each detector in the array can be computed, both for the reference plane and the object surface. Based on the continuity of the phase function, starting from a reference location with zero phase, the integer M of Eq. (6) can also be determined by monitoring the computed phases between two adjacent detectors and identifying sharp phase discontinuities which result from the $2\pi$ transitions. Eqs. (3) and (5) can then be used to compute the surface profile, as is further described below.

Figure 4A:
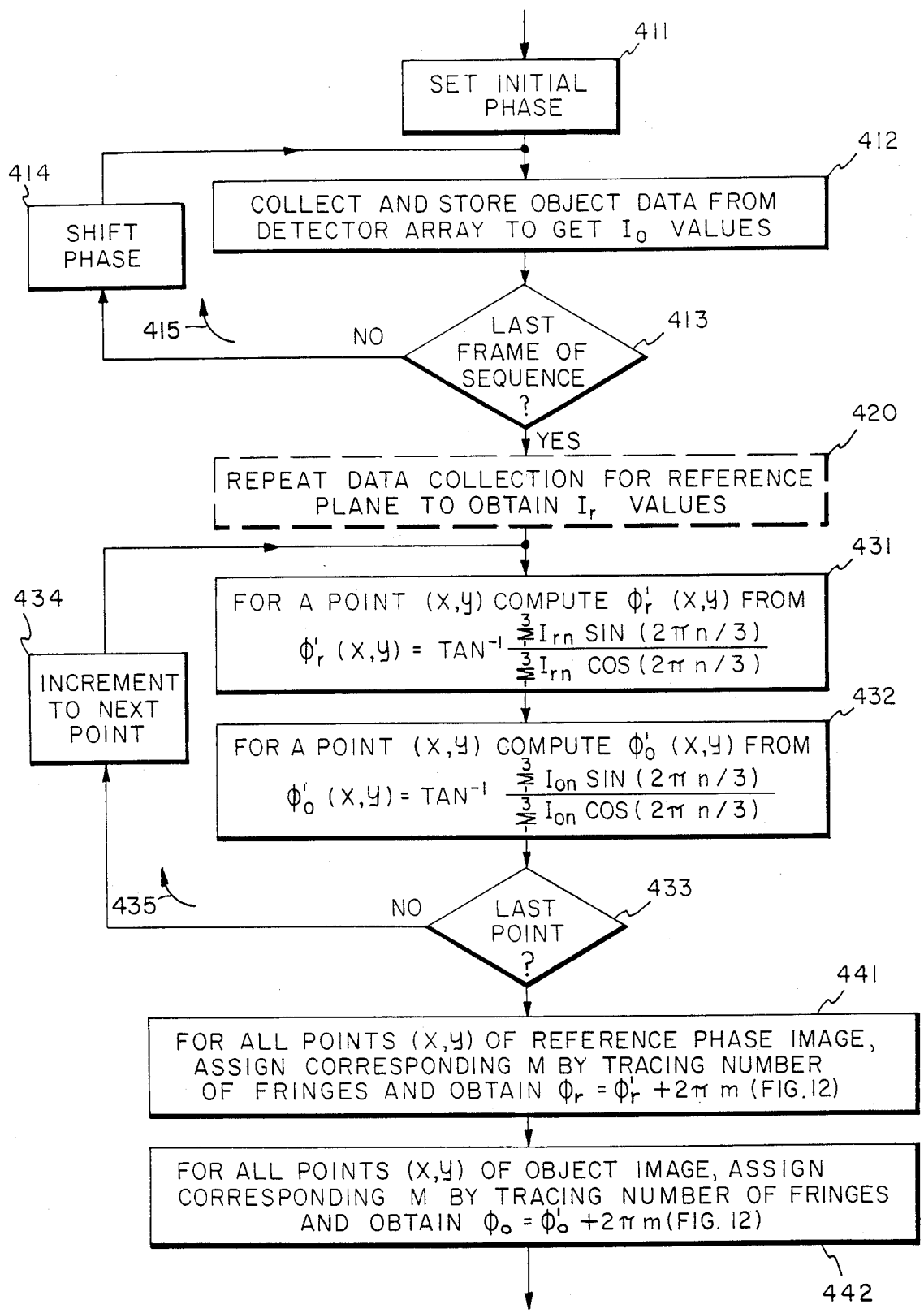
FIG. 4, which includes FIGS. 4A and 4B placed one below another, is a flow diagram of a routine for programming the processor of the FIG. 1 embodiment in accordance with a form of the invention.
Figure 4B:
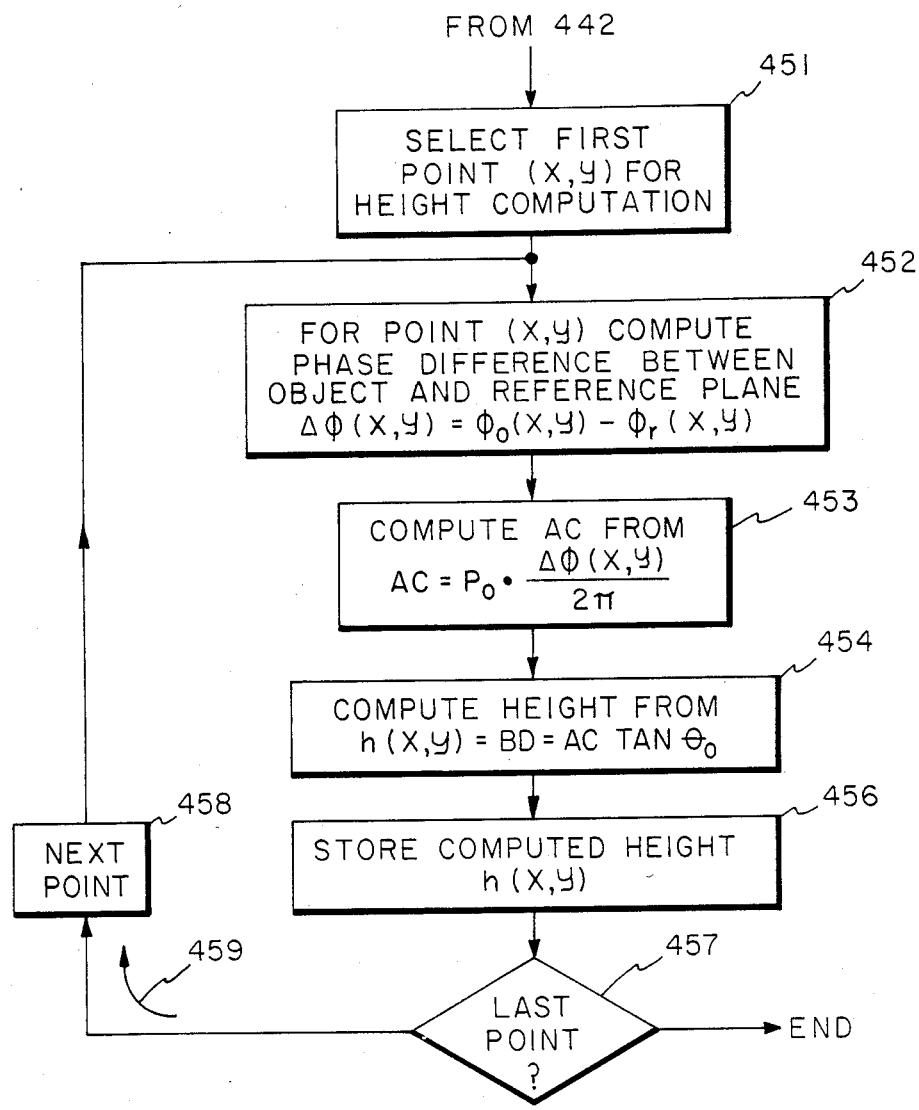

Referring to FIG. 4, there is shown a flow diagram of a routine for programming the processor 150 of FIG. 1 in accordance with a form of the first embodiment of the invention. The block 411 represents the setting of the initial phase of the incident beam of sinusoidally varying intensity; e.g., for example, to a reference phase designated as zero degrees. A frame of data (intensity information) is then collected and stored from the detector array to get a first set of intensity values for the object designated as $I_{o1}(x,y)$ values. A determination is then made (diamond 413) as to whether or not the last frame of the sequence has been collected and stored. If not, the block 414 is entered, this block representing the shifting of the phase of the incident beam, such as by rotating the polarizer (FIG. 2). In the present embodiment, three frames are used in the sequence, so there are two phase shifts of 120 degrees each. It will be understood that the phase shifting can be implemented automatically under computer control, semi-automatically, or manually, as desired. Accordingly, at the completion of the loop 415, three frames of intensity values for the object, $I_{on}(x,y)$ are obtained, as follows:

$$I_{o1} = a + b \cos(\phi_M + \phi_o'(x,y))$$

$$I_{o2} = a + b \cos(\phi_M + \phi_o'(x,y) + 2\pi/3)$$

$$I_{o3} = a + b \cos(\phi_M + \phi_o'(x,y) + 4\pi/3)$$

The procedure of loop 415 is then repeated for the reference plane, as represented by the block 420. This data can be obtained, for example, by placing a white reflective reference plane adjacent the object, as illustrated in FIG. 3, and following the procedure just described to obtain frames of reference intensity values $I_{rn}(x,y)$ as follows:

$$I_{r1} = a + b \cos(\phi_M + \phi_r'(x,y))$$

$$I_{r2} = a + b \cos(\phi_M + \phi_r'(x,y) + 2\pi/3)$$

$$I_{r3} = a + b \cos(\phi_M + \phi_r'(x,y) + 4\pi/3)$$

It will be understood that the data could alternatively be taken in any desired sequence, such as by interposing the reference plane before each phase shift so as to obtain both the object and reference intensity information at each incident beam phase, although this is not preferred. Also, it will be understood that the reference phase information can be computed without taking measured reference data (from the known characteristics of the incident beam and the known system geometry), but it is preferable, when possible, to obtain the reference data from an actual reference plane so as to minimize the effects of distortions in the system, etc.

Next, for a point $(x,y)$ the reference plane phase $\phi_r'(x,y)$ at the point can be computed, using (8) above, from the three reference plane intensities as:

$$\phi_r'(x,y) = \tan^{-1} \frac{\sum_{1}^{3} I_{rn}\sin(2\pi n/3)}{\sum_{1}^{3} I_{rn}\cos(2\pi n/3)}$$

as represented by the block 431. The block 432 is then entered, this block representing the computation, for point $(x,y)$ of the object phase from the three object intensity measurements as:

$$\phi_o'(x,y) = \tan^{-1} \frac{\sum_{1}^{3} I_{on}\sin(2\pi n/3)}{\sum_{1}^{3} I_{on}\cos(2\pi n/3)}$$

A determination is made as to whether or not the last point has been processed (diamond 433), and, if not, the processor increments to the next point (block 434), and the loop 435 continues until the reference and object phases have been computed for all desired points $(x,y)$.

Figure 12:
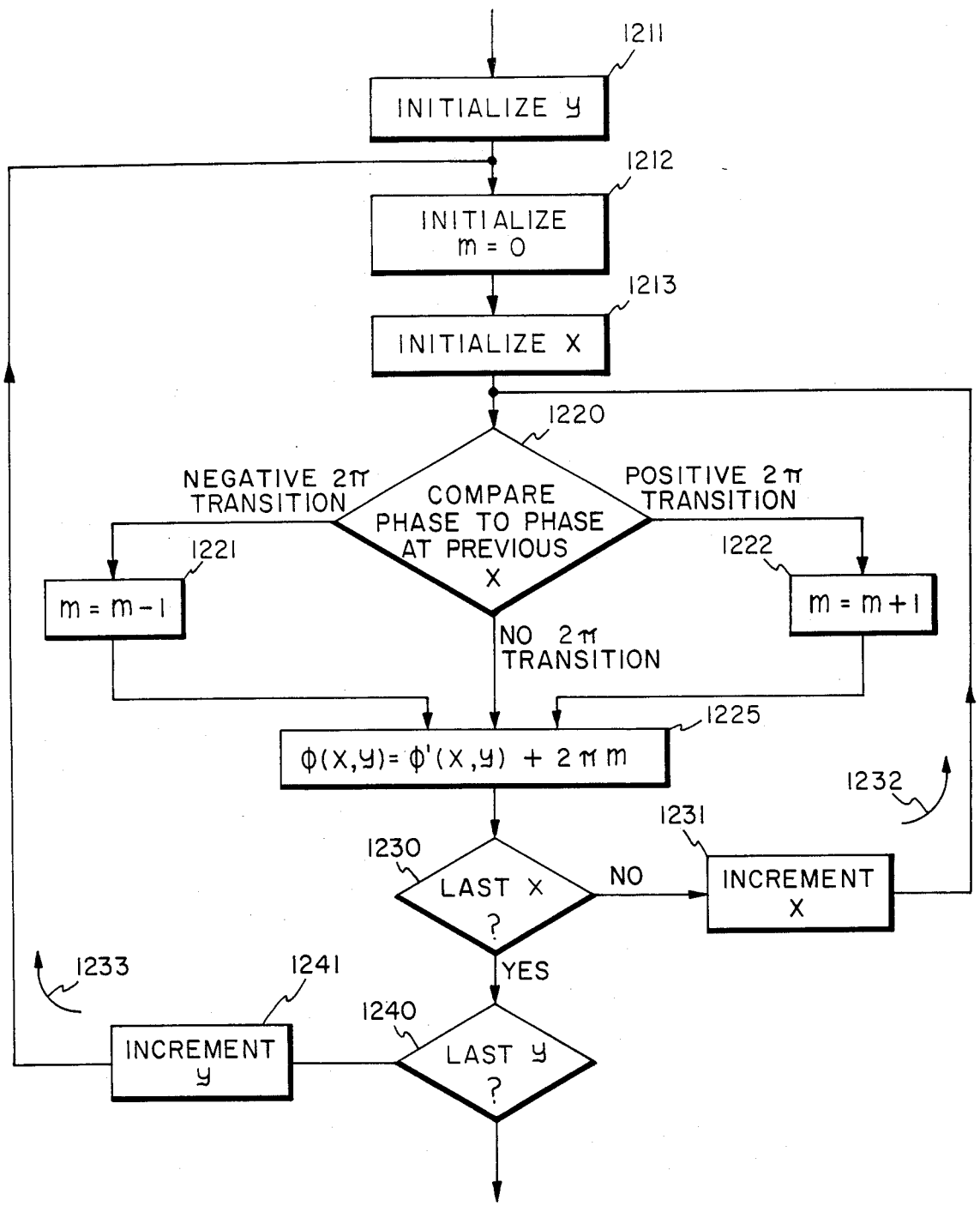
FIG. 12 is a flow diagram of a routine that is used in conjunction with the routines of FIGS. 4 and 8.

The block 441 is then entered. This block represents the procedure of assigning, for each point $(x,y)$ the appropriate integer m (see equation (6)) by tracing the number of fringes on the reference plane image, where m is the fringe number, and then the determination of the reference plane phase for each such point. The block 442 represents the same operation for each point of the object. FIG. 12 is a flow diagram of a routine as represented by the blocks 441 and 442 for tracing the deformed grating fringes in order to assign appropriate m integer values, so that the object and reference phases $\phi_o(x,y)$ and $\phi_r(x,y)$, respectively, can be obtained from $\phi_o'(x,y)$ and $\phi_r'(x,y)$. A y coordinate index is initialized (block 1211), m is initialized at zero (block 1212), and the x index is also intialized (block 1213). Processing then proceeds on a line-by-line basis along the x direction. For a given line, at each point, the previously computed phase value (for the object phase or the reference plane phase, depending on which one is being processed), the phase at each point is compared to the phase at the previous point, as represented by the diamond 1220. The adjacent phase values are compared by determining when there is a transition over a $2\pi$ value, and the sign of the transition is also noted. The sign will depend on the slope of the object profile. Blocks 1221 and 1222, as the case may be, are then utilized to decrement or increment m, depending upon the sign of the transition, and the block 1225 is then entered. Also, if there was no transition at the point being examined, the block 1225 is entered directly. The block 1225 then represents the computation of the reference plane or object phase value (as the case may) in accordance with relationship (6). The x index is then tested (diamond 1230) and incremented (block 1231), and the loop 1232 continues for processing of an entire line in the x direction on the detector array. When the line is complete, the y index is tested (diamond 1240) and incremented (block 1241) and the loop 1233 is continued until all lines of points have been processed.

Referring again to FIG. 4, the block 451 represents the selection of the first point $(x,y)$ for height computation. For the particular point $(x,y)$, the phase difference between the object and reference planes is computed in accordance with:

$$\Delta\phi(x,y) = \phi_o(x,y) - \phi_r(x,y)$$

as represented by the block 452. The distance AC (FIG. 3) can then be computed (block 453) from $$AC = P_o \cdot \frac{\Delta\phi(x,y)}{2\pi}$$

Next, the block 454 represents the conversion into height BD, which is defined as h(x,y) in accordance with equation (5) as $$h(x,y) = BD = AC \tan \theta_o$$

It can be noted that suitable calibration factor and geometric correction can also be applied to h(x,y). h(x,y) can then be stored for display or other use, as represented by the block 456. Inquiry is then made (diamond 457) as to whether or not the last point has been procesed and, if not, the point being processed is incremented (block 458) and the loop 459 continues as the height values h(x,y) are obtained and stored for each point.

Figure 5:
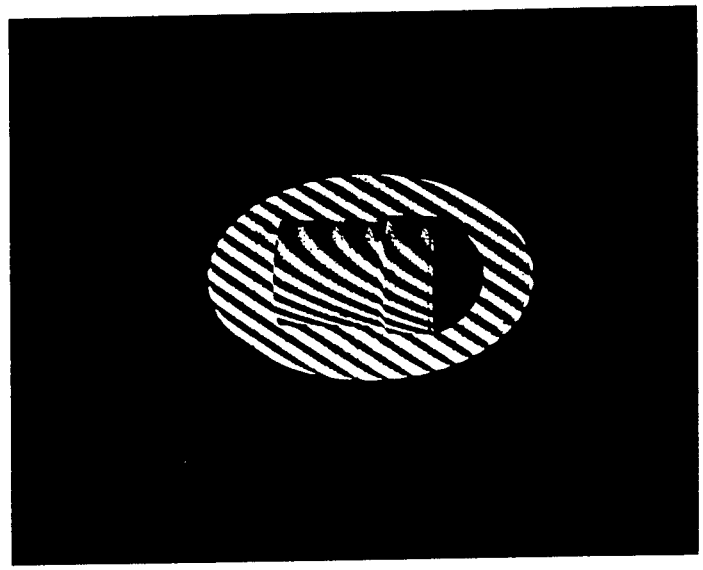
FIG. 5 shows a deformed grating interferogram of a three dimensional object as seen by the detector array of the FIG. 1 embodiment.
Figure 6:
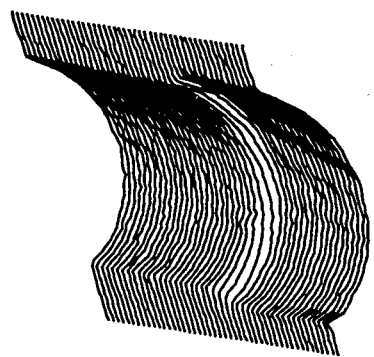
FIG. 6 is a surface profile block of the three dimensional object of FIG. 4, as generated using an embodiment of the invention.

Surface profile measurements were made, using the system of FIGS. 1, 2, on a general test object (a half cylinder with two sections having different radii), mounted on a reference plane and illuminated with a sinusoidally varying beam intensity as previously described. In order to generate a phase variation in both the horizontal as well as vertical directions an inclined set of fringes were projected on the object. FIG. 5 shows the deformed grating as seen by the detector array. Three images each were recorded for the reference plane and the object surface, with a phase increment of 120° of the projected fringe pattern following each recording, and processing was performed as previously described. FIG. 6 shows part of the surface profile plot, which was generated by displaying h(x,y) using a graphics plotter. The two sections of the object with different radii and the transition region are seen. The values obtained were very close to those measured using a contact profilimeter.

Figure 7:
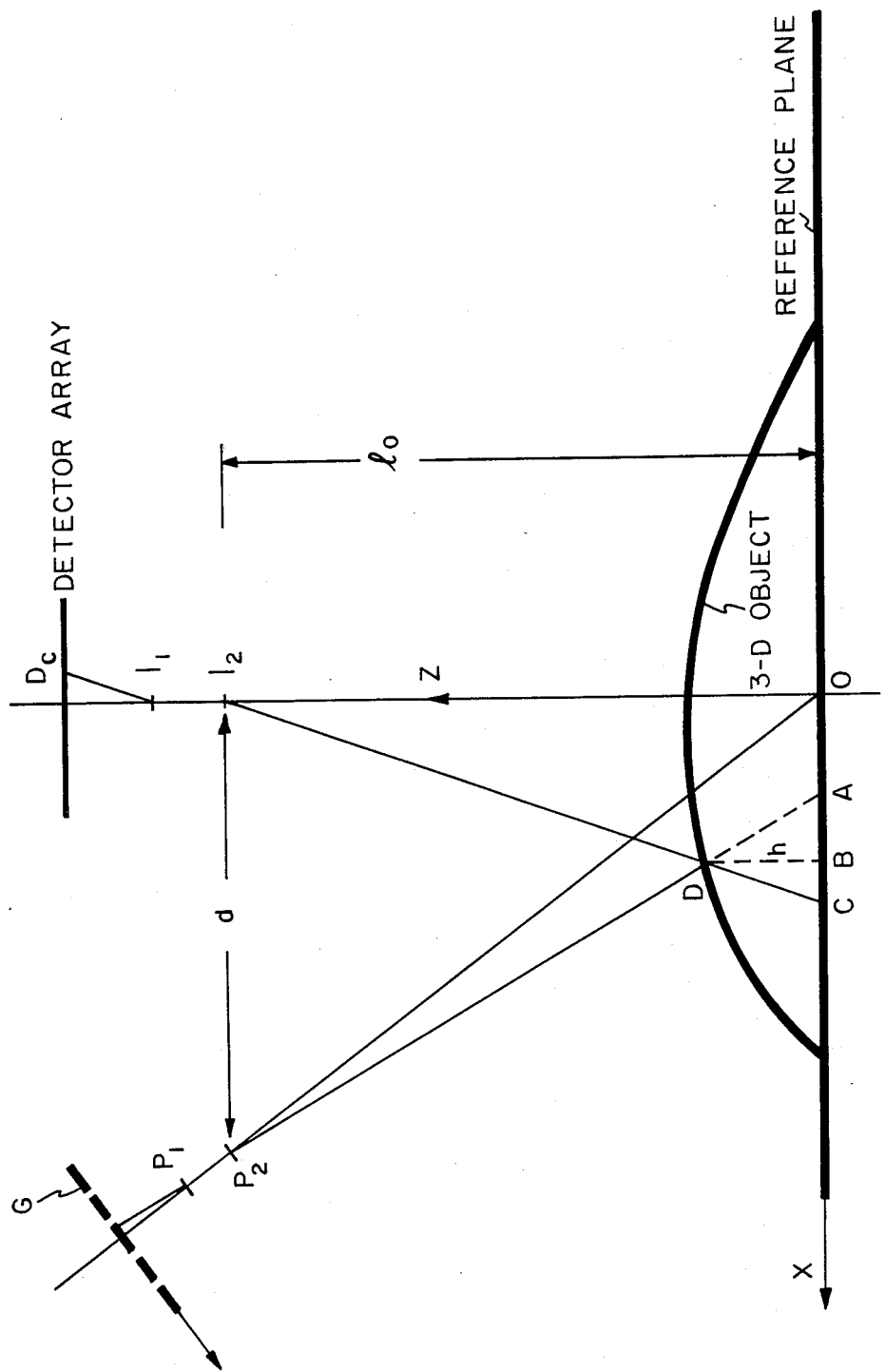
FIG. 7 is a schematic diagram which illustrates a further embodiment of the invention, and is used in describing the optical geometry thereof.

In the embodiment of FIG. 7, the collimated laser illumination is replaced by the projected image of a translatable white light illuminated sinusoidal transmission grating. This system requires generally less expensive hardware than the previous embodiment, and is more capable of handling large objects. The analysis of this system, because of the divergent nature of the illumination and because the optical axes of the projection and imaging systems are not necessarily parallel, is somewhat more complicated. In the FIG. 7 arrangement it is assumed that a buffer, processor, display and projection and imaging lenses are provided, as in the previous embodiment. The optical geometry of the projection and recording systems is represented in FIG. 7. $P_1$ and $P_2$ are the centers of the entrance and exit pupils of the projection optics. $I_1$ and $I_2$ are the centers of the exit and entrance pupils of the imaging optics. G is a grating with pitch p and a sinusoidal intensity transmission. $D_c$ is one element of the image sensing array. The intensity variation along x on the reference plane can be described by the equation:

$$I = a(x,y) + b(x,y) \cos \phi(x) \quad (9)$$

where a(x,y) is the background or DC light level and b(x,y) is the fringe contrast. The phase $\phi$ in this case is a non linear function of x because of the divergent nature of the image forming rays. With respect to a reference point such as O, every point on the reference plane is characterized by a unique phase value. For example, the point C, observed by the detector D or the array, has $$\phi_c = 2\pi m + \phi_c' \quad (10)$$

where m is an integer and $0 < \phi_c' < 2\pi$.

The detector array samples the reference plane (as well as the object) and is again used to measure the phase at the sampling points by a phase shifting technique. As before, N frames of intensity data, with $N > 2$, are recorded and after each frame the grating G is translated by a distance $P_o/N$. If $I_1, I_2, \ldots I_N$ are the intensity measurements for a point such as C, then, as previously described $$\tan \phi_c' = \frac{\sum\limits_{1}^{N} I_n \sin(2\pi n/N)}{\sum\limits_{1}^{N} I_n \cos(2\pi n/N)} \quad (11)$$

As the phase function is continuous, it is possible, as previously described, to determine m in equation (10) by detecting sharp phase changes of nearly $2\pi$ which occur between two neighboring sample points, whenever a complete grating period has been sampled.

A particular detector such as $D_c$ can measure the phase $\phi_c$ at a point C on the reference plane as well as $\phi_D$ on the point D of the object. A mapping procedure is then used to determine a point A on the reference plane such that $\phi_A = \phi_D$. This enables a computation of the geometric distance AC. C is a known detector location and the position of A, which in general would lie between two sampling points, can be located by linear interpolation using known phase values. From similar triangles $P_2DI_2$ and ADC, the object height is $$h(x,y) = (AC/d) \cdot l_o (1 + AC/d)^{-1} \quad (12)$$

where d and $l_o$ are distances as shown in FIG. 1. As in most practical situations $d >> AC$ because of the large magnifications involved, equation (12) can be simplified:

$$h(x,y) = (AC/d) \cdot l_o \quad (13)$$

It can be noted that h(x,y) is the object height at the x coordinate corresponding to B and not C. From known system geometrical parameters, one can calculate the distance BC and thus determine the x coordinate corresponding to the point B.

Figure 8A:
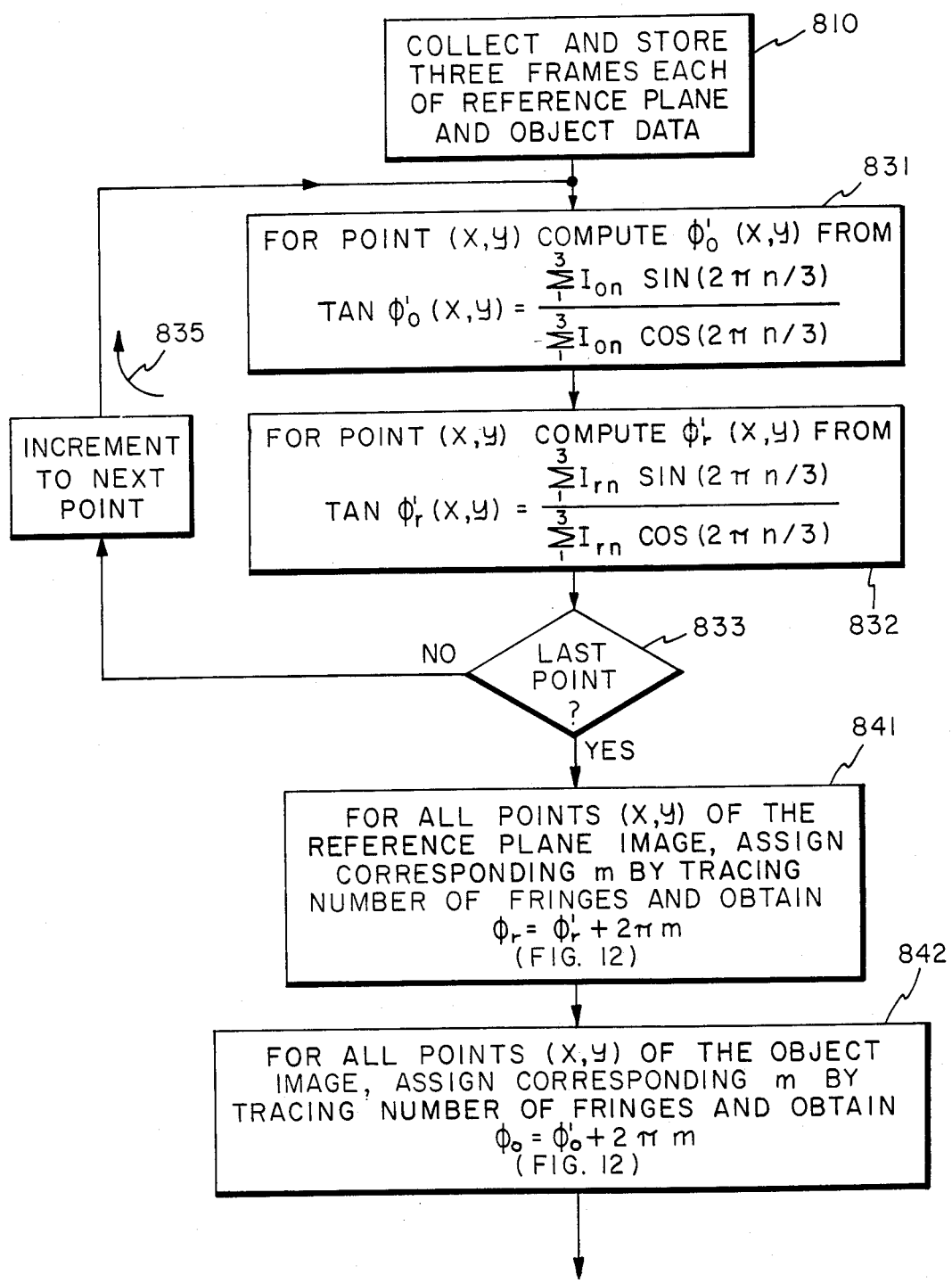
FIG. 8, which includes FIGS. 8A and 8B placed one below another, is a flow diagram of a routine for programming the processor of the FIG. 7 embodiment for operation in accordance with a further form of the invention.

In the routine of FIG. 8, the block 810 represents the collecting and storing of three frames of reference plane and object data in a manner similar to that previously described in conjunction with the loop 415 of FIG. 4. In this case, however, in the context of the system of FIG. 7, the phase shifting will be implemented by translation of the grating G. In this case, the three arrays of object intensity values can be represented as $$I_{o1} = a'(x,y) + b'(x,y) \cos \phi_o(x,y)$$

$$I_{o2} = a'(x,y) + b'(x,y) \cos (\phi_o(x,y) + 2\pi/3)$$

$$I_{o3} = a'(x,y) + b'(x,y) \cos (\phi_o(x,y) + 4\pi/3)$$

and the three arrays of reference plane intensity values can be represented as $$I_{r1} = a'(x,y) + b'(x,y) \cos \phi_r(x,y)$$

$$I_{r2} = a'(x,y) + b'(x,y) \cos(\phi_r(x,y) + 2\pi/3)$$

$$I_{r3} = a'(x,y) + b'(x,y) \cos(\phi_r(x,y) + 4\pi/3)$$

For a point (x,y), the object phase $\phi_o'$ is then computed from $$\tan\phi_o'(x,y) = \frac{\sum_1^3 I_{on}\sin(2\pi n/3)}{\sum_1^3 I_{on}\cos(2\pi n/3)}$$

and the reference phase $\phi_r'$ is computed in accordance with $$\tan\phi_r'(x,y) = \frac{\sum_1^3 I_{rn}\sin(2\pi n/3)}{\sum_1^3 I_{rn}\cos(2\pi n/3)}$$

These functions are represented by the blocks 831 and 832, and are consistent with the equation (11) above. The loop 835 then continues, in similar manner to that previously described in conjunction with FIG. 4, to obtain the reference and object phases for all desired points (x,y), diamond 833 and block 834 being used in the loop in the manner previously set forth.

Next, as represented by the block 841, for each point (x,y), the appropriate integer m (see equation (10)) is obtained by tracing the number of fringes on the reference plane image, where m is the fringe number, and the reference plane phase for each such point is then determined. The block 842 represents the same operation for each point of the object. Reference can again be made to FIG. 12, and the accompanying description above, for the manner in which the resultant phases $\phi_r(x,y)$ and $\phi_o(x,y)$ are obtained.

Figure 8B:
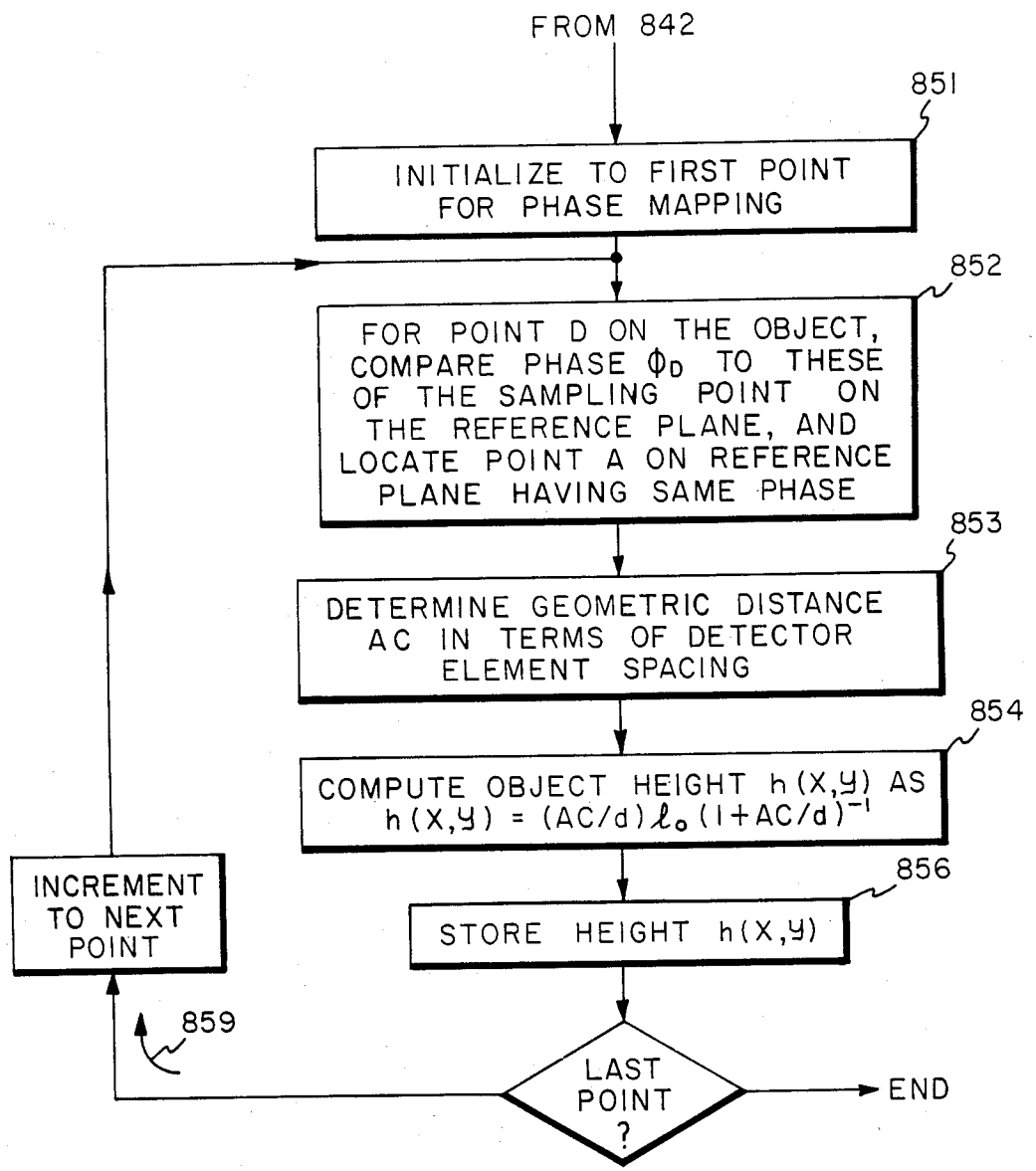

FIG. 8B includes the phase mapping portion of the routine. A first point is selected for phase mapping, as represented by the block 851. For the point D on the object, the phase $\phi_o(x,y)$ is compared to the phases of the sampling points on the reference plane, so as to locate point A on the reference plane which has the same phase. The geometric distance AC, between the points having the same phase, is then determined in terms of detector element spacings (block 853). The object height can then be computed (equation (12)) as:

$$h(x,y) = (AC/d)l_o(1 + AC/d)^{-1}$$

as represented by the block 854. Alternatively, as described above, equation (13) could be used in some situations. Again, suitable calibration factor and geometric correction can then be applied, and the height h(x,y) is stored, as represented by block 856. Inquiry is then made (diamond 857) as to whether or not the last point has been processed. If not, the point to be processed is incremented (block 858), and the loop 859 is continued to completion.

For experimental measurements, sinusoidal gratings were generated by photographing out of focus a square wave grating pattern. A conventional slide projector was modified in order to operate with a grating slide, mounted on a stepper motor driven translation stage. The period of the projected grating measured on the reference plane, close to the optical axis of projection, was about 15 mm. Deformed grating images were recorded on a 128×128 photodiode array detector. Phase measurement was by a three discrete phase shift implementation of equation (11), and processing was in accordance with the routine previously described.

Figure 9:
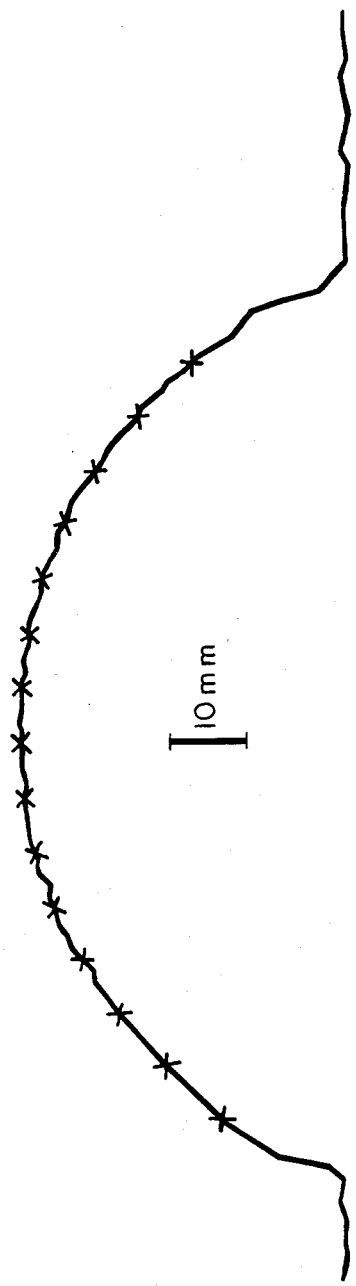
FIG. 9 shows the result of a calibration experiment, using a technique in accordance with the embodiment of FIG. 7.

The results of a calibration experiment, using a cylindrical test object, which had been measured by a mechanical contact profilometer, are shown in FIG. 9. The line profile was generated using the experimental optical system and the 'X' marks indicate measurements made by a manual contact profilometer. An agreement of better than 1% between the measurements was observed, except in the regions with steep slopes where mechanical contact methods are not very reliable.

Figure 10:
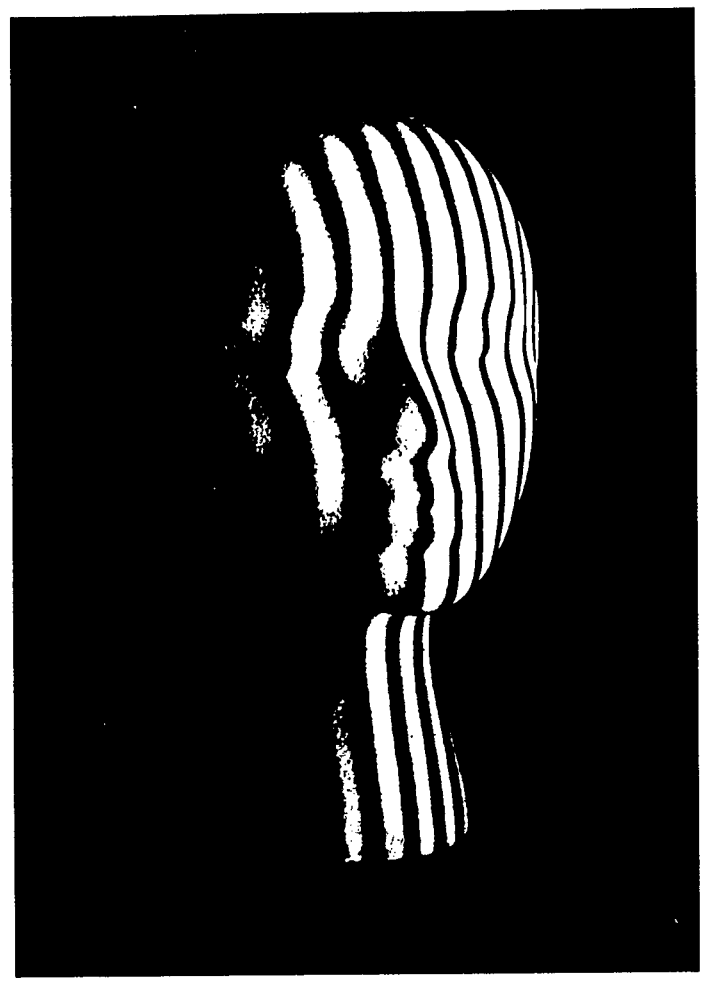
FIG. 10 shows a mannequin face with a projected sinusoidal grating of 15 mm period.
Figure 11:
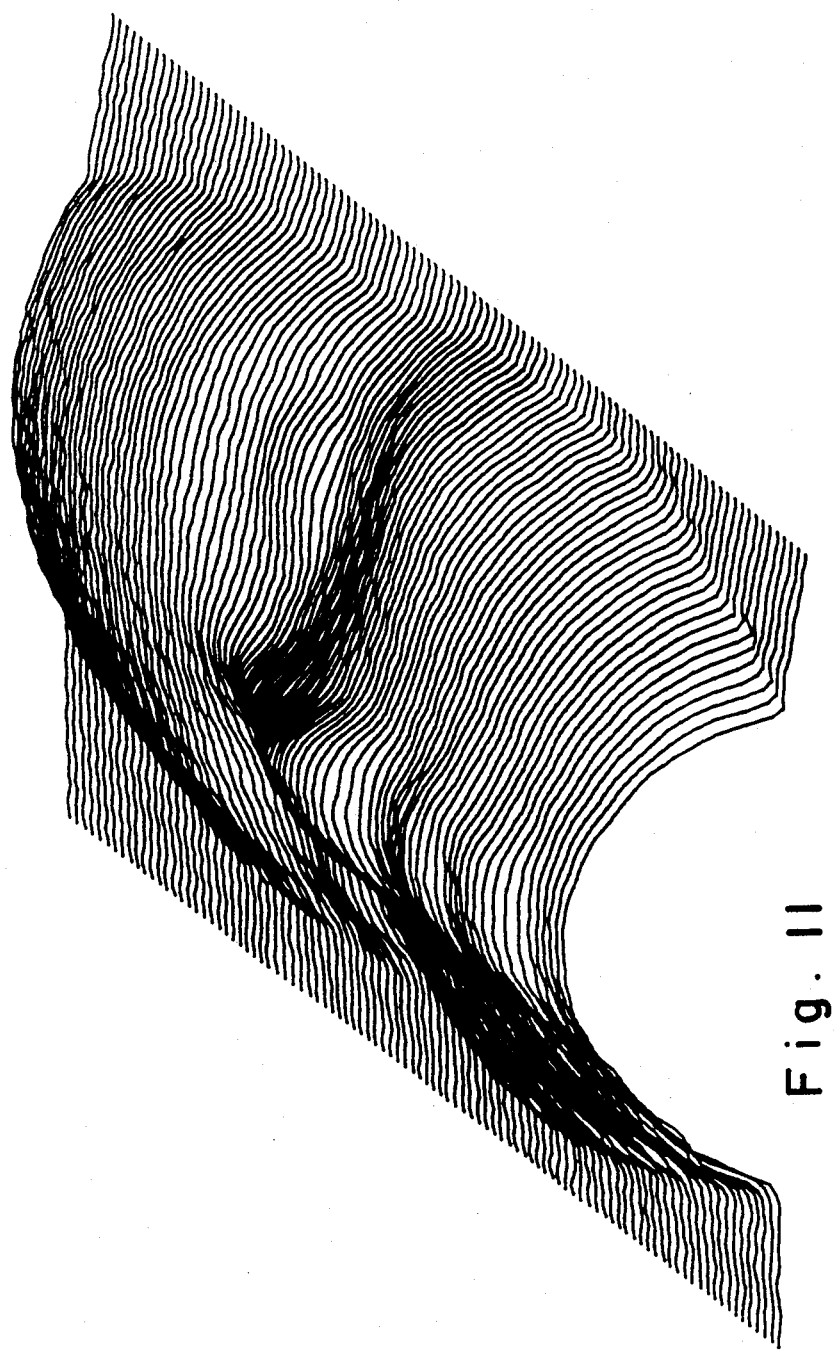
FIG. 11 is a perspective profile plot of the mannequin face with respect to a reference plane, as obtained using an embodiment of the invention.

A more general type of diffuse object, a mannequin face, was also measured. FIG. 10 shows the deformed grating produced by this object. FIG. 11 is a graphical representation of the results obtained with the optical system and shows 97 profile lines with 87 points on each line. This object was approximately 150 mm wide and the depth at the tip of the nose measured from a reference plane was about 100 mm. In order to obtain a complete shadow-free illumination of such objects and obtain a large angular field of view, two or more projected gratings may be used.

The invention has been described with reference to particular preferred embodiments, but variations within the spirit and scope of the invention will occur to those skilled in the art. For example, various alternative types of projection and detector systems can be used, consistent with the principles of the invention, and the processor steps can be performed in various suitable orders.

We claim:

1. A method for determining the surface profile of an object, comprising the steps of:
   directing at said object an incident beam of light having a sinusoidally varying intensity pattern;
   modulating the phase of the sinusoidal intensity pattern of said incident beam;
   receiving at a detector a deformed grating image of the object for a number of different modulated phases of said incident beam;
   determining, for points on the surface of the object, the height at each said point with respect to a reference plane, each said height determination including the step of combining image intensity values, for said different modulated phases of the incident beam, at a detector position corresponding to a respective point of the object.

2. The method as defined by claim 1, wherein said intensity values at each detector pixel position are combined to determine an object phase at a corresponding object point, and wherein the difference between the object phase at each such point and a reference phase at a corresponding point on the reference plane is used to determine the object height at such point.

3. The method as defined by claim 2, wherein said reference phases are obtained by positioning a reference plane in the vicinity of the object position, and determining, for points on the reference plane, detector intensity values for said different modulated phases of said incident beam, said intensity values for each point being combined to obtain a reference phase for such point.

4. The method as defined by claim 1, wherein said number of different phases of the incident beam comprises three different phases.

5. The method as defined by claim 3, wherein said number of different phases of the incident beam comprises three different phases.

6. The method as defined by claim 1, wherein reference phases are obtained by positioning a reference plane in the vicinity of the object position, and determining, for points on the reference plane, detector intensity values for said different modulated phases of said incident beam, said intensity values for each point being combined to obtain a reference phase for such point; and wherein said step of determining height includes determining the distance between positions on the detector at which a reference phase corresponds to an object phase.

7. The method as defined by claim 6, wherein said number of different phases of the incident beam comprises three different phases.

8. A method for determining the surface profile of an object, comprising the steps of:
  directing at said object an incident beam of light having a sinusoidally varying intensity pattern;
  modulating the phase of the sinusoidal pattern of said incident beam;
  receiving and storing a deformed grating image of the object for a number of different modulated phases of said input beam;
  receiving and storing an image of a reference plane for said number of different modulated phases of said input beam;
  combining image intensity values at each point of the deformed grating image of the object to obtain an object phase at each such point;
  combining image intensity values at each point of the image of the reference plane to obtain a reference plane phase at each such point; and
  determining the object height at each point from the object phase and reference plane phase for each such point.

9. The method as defined by claim 8, wherein the difference between the object phase at each point and the reference phase at a corresponding point on the reference plane is used to determine the object height at such point.

10. Apparatus for determining the surface profile of an object, comprising:
  means for directing at said object an incident beam of light having a sinusoidally varying intensity pattern;
  means for modulating the phase of the sinusoidal intensity pattern of said incident beam;
  a detector for receiving a deformed grating image of the object for a number of different modulated phases of said incident beam; and
  means for determining, for points on the surface of the object, the height at each said point with respect to a reference plane, said means being operative to combine image intensity values, for said different modulated phases of the incident beam, at a detector position corresponding to a respective point of the object.

11. Apparatus as defined by claim 10, wherein said determining means is operative to combine intensity values at each detector pixel position to determine an object phase at a corresponding object point, and is operative to obtain the difference between the object phase at each such point and a reference phase at a corresponding point on the reference plane to determine the object height at such point.

* * * * *